United States Patent

Ku et al.

[11] Patent Number: 6,000,282
[45] Date of Patent: Dec. 14, 1999

[54] SYSTEM AND METHOD FOR UNIFORM FREQUENCY RESPONSE INDEPENDENT OF SLIDER CONTACT LOCATION IN GLIDE TESTS

[75] Inventors: Chiao-Ping Ku, Fremont; Alex Yu-Chih Tsay, San Jose, both of Calif.

[73] Assignee: Seagate Technology, Inc., Scotts Valley, Calif.

[21] Appl. No.: 09/158,297

[22] Filed: Sep. 22, 1998

Related U.S. Application Data

[60] Provisional application No. 60/074,772, Feb. 17, 1998.

[51] Int. Cl.$^6$ .................................................. G01B 5/28
[52] U.S. Cl. .................................................. 73/105
[58] Field of Search .................................................. 73/105

[56] References Cited

U.S. PATENT DOCUMENTS

| | | | |
|---|---|---|---|
| 4,532,802 | 8/1985 | Yeack-Scranton et al. | 73/866.4 |
| 5,168,412 | 12/1992 | Doan et al. | 73/105 X |
| 5,423,207 | 6/1995 | Flechsig et al. | 73/105 X |
| 5,450,747 | 9/1995 | Flechsig et al. | 73/105 |
| 5,581,021 | 12/1996 | Flechsig et al. | 73/105 |
| 5,689,064 | 11/1997 | Kennedy et al. | 73/105 |
| 5,817,931 | 10/1998 | Boutaghou | 73/105 |
| 5,864,054 | 1/1999 | Smith, Jr. | 73/105 |

OTHER PUBLICATIONS

Wallash, "Reproduction of Slider Vibrations During Head/Disk Interactions Using PZT Sensors", IEEE Transactions on Magnetics, vol. 24, No. 06, Nov. 1988, pp. 2763–2765.

*Primary Examiner*—Daniel S. Larkin
*Attorney, Agent, or Firm*—Merchant & Gould P.C.

[57] ABSTRACT

A system for detecting and measuring the height of asperities on a substantially flat solid surface is disclosed. The system includes a glide head assembly for contacting asperities on the substantially flat solid surface and producing a sensor voltage whose frequency response is a function of both the height of the asperities and the location at which the glide head assembly contacts the asperities. The system also includes a signal processing device responsive to the sensor voltage from the glide head assembly for analytically defining a frequency window within which the frequency response of the sensor voltage is relatively independent of the location on the glide head assembly at which the glide head assembly contacts the asperities. The signal processing device measures the height of an encountered asperity by computing an actual RMS voltage within the frequency window of the frequency response of the sensor voltage produced by the glide head assembly after contacting the asperity.

21 Claims, 4 Drawing Sheets

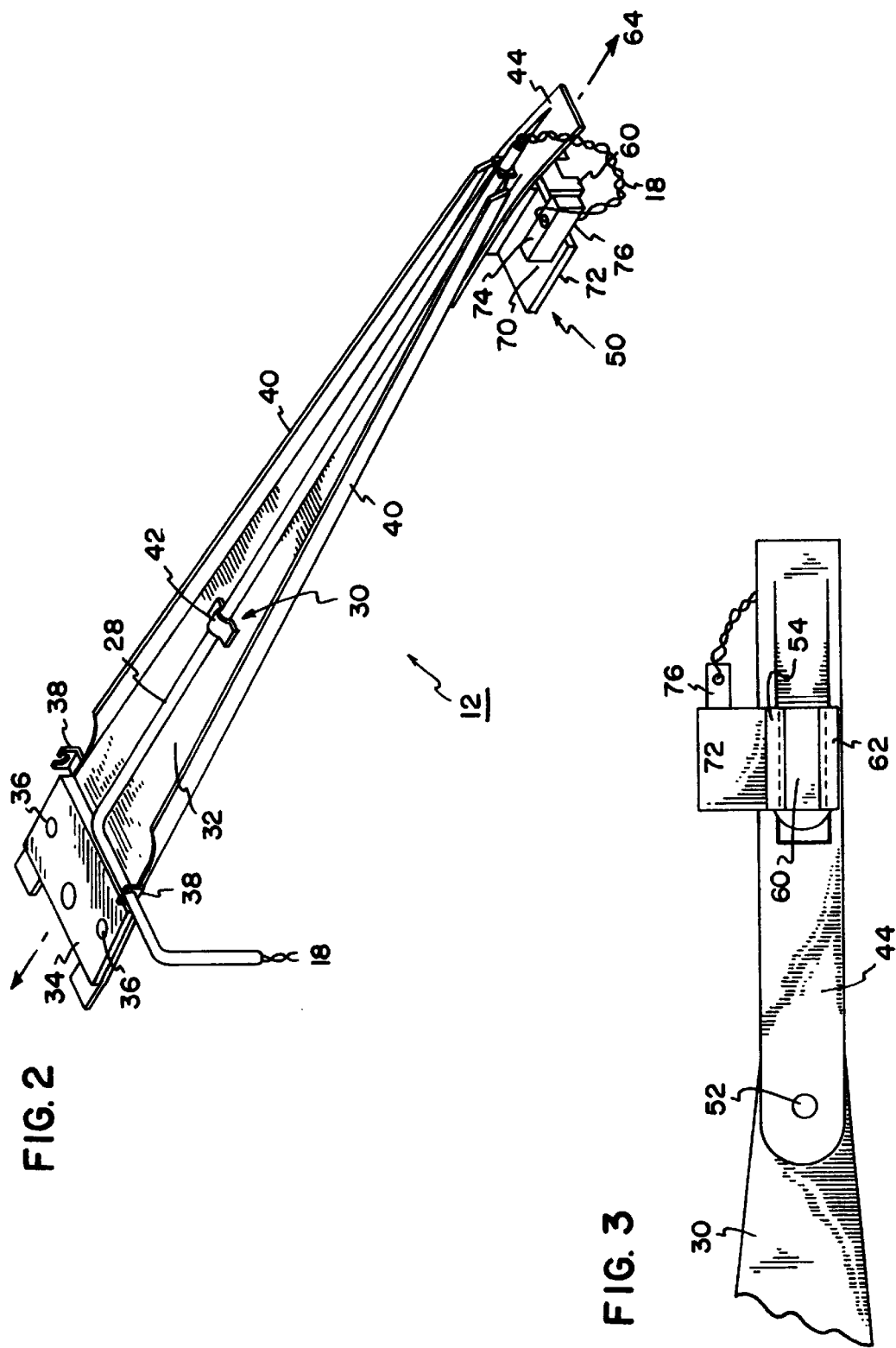

SYSTEM AND METHOD FOR UNIFORM FREQUENCY RESPONSE INDEPENDENT OF SLIDER CONTACT LOCATION IN GLIDE TESTS

CROSS-REFERENCE TO RELATED APPLICATIONS

Embodiments of this invention relate to Provisional Application Ser. No. 60/074,772, filed Feb. 17, 1998. The contents of that application are incorporated by reference herein.

BACKGROUND OF THE INVENTION

1. Field of the Invention

Embodiments of this invention relate generally to glide testing for detecting asperities on magnetic media of the type generally used for storing digital data, and in particular embodiments to methods for accurately measuring the height of asperities independent of where the asperity contacts the glide head assembly, and systems incorporating the same.

2. Description of Related Art

Modern computers require media in which digital data can be quickly stored and retrieved. Magnetizable (hard) layers on disks have proven to be a reliable media for fast and accurate data storage and retrieval. Disk drives that read data from and write data to hard disks have thus become popular components of computer systems. To access memory locations on a hard disk, a read/write head is positioned slightly above the surface of the hard disk while the hard disk rotates beneath the read/write head at an essentially constant number of revolutions per minute (RPM). By moving the read/write head radially over the rotating hard disk, all memory locations on the hard disk can be accessed. The read/write head is typically referred to as "flying" head because it hovers above the surface on an air bearing located between the hard disk and the head, caused by rotation of the hard disk at high speeds.

Asperities, which are essentially protrusions on the surfaces of the hard disks, may cause problems when encountered by the read/write head. These asperities can cause errors in the transfer of information or even damage to the read/write head. In an effort to reduce the number of asperities, manufacturers commonly burnish the surfaces of the disk. During the burnishing process a burnishing head, rather than a magnetic read/write head, is positioned over the hard disk in a manner similar to a read/write head. Burnishing heads may be designed as either "flying" burnishing heads which pass over the surface to be burnished, or they may be designed as "contact" burnishing heads which directly engage the asperities. During the burnishing process, the burnishing head operates to smooth out these surface protrusions.

Once the initial burnishing is complete, a glide test is performed to detect, either proximately or by contact, any remaining asperities which may come into contact with the read/write head during use. Glide tests utilize glide heads which hover and detect asperities protruding from the hard disk surface, and may be programmed to reject hard disks with asperities larger than the "flying" height of the read/write head.

A typical glide head employs a slider, a component aerodynamically configured to "fly" over the hard disk at a predetermined height for a given hard disk speed, and a block of piezoelectric material attached to the slider. Piezoelectric material produces an electric potential when vibrated or otherwise physically disturbed. When the slider contacts a surface asperity, the shock to the slider temporarily disturbs the crystalline lattice of the piezoelectric material, causing a voltage to develop across its electrodes. The voltage of the piezoelectric material exhibits a frequency response with distinct vibrational modes dependent on the type of crystalline disturbance produced, and a magnitude dependent on the size of the asperity and the location on the slider that comes into contact with the asperity.

A continuing trend in the magnetic media industry is the development of hard disks with increased recording densities. As recording density increases, read/write head size and flying height must correspondingly decrease to properly read from and write to increasingly smaller areas on the hard disk. Accordingly, for manufacturers to develop production-quality hard disks, it has become necessary to utilize glide heads of decreased size and flying height with more sensitive response characteristics.

However, as the size of glide heads decrease, it is becoming difficult to precisely control their electrical response characteristics. For example, as the size of a glide head decreases, it becomes increasingly difficult to determine the location on the slider that comes into contact with the asperity. Because the frequency response of the piezoelectric material is dependent on both the size of the asperity and the point of contact on the slider, if the point of contact on the slider is unknown then the size of the asperity cannot be accurately determined from the frequency response. This uncertainty in the size of the asperity encountered may lead to the rejection of good disks or the acceptance of deficient disks.

SUMMARY OF THE DISCLOSURE

Therefore, it is an object of embodiments of the invention to provide a system and method for detecting and accurately measuring asperities on a hard disk independent of the point on the slider at which it contacts the asperity.

It is a further object of embodiments of the invention to provide a system and method for detecting and accurately measuring asperities on a hard disk independent of the point on the slider at which it contacts the asperity, and for rejecting those hard disks with asperities of a height greater than a predetermined level.

These and other objects are accomplished according to a system for detecting and measuring the height of asperities on a substantially flat solid surface. The system includes a glide head assembly for contacting asperities and producing a sensor voltage whose frequency response is a function of both the height of the asperities and the location at which the glide head assembly contacts the asperities. The system also includes a signal processing device responsive to the sensor voltage from the glide head assembly for analytically defining a frequency window within which the frequency response of the sensor voltage is relatively independent of the location on the glide head assembly at which the glide head assembly contacts the asperities. The signal processing device measures the height of an encountered asperity by computing an actual root-mean-square (RMS) voltage within the frequency window of the frequency response of the sensor voltage produced by the glide head assembly after contacting the asperity.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 2 is a perspective view showing a glide head assembly according to an embodiment of the invention.

FIG. 3 is a partial bottom view of the distal end of a glide head assembly showing the slider and its rails according to an embodiment of the invention.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention. For example, although the description and drawings reference a hard disk, it is understood that embodiments of the present invention may be used to detect asperities on any substantially flat solid surface.

During the manufacturing of hard disks, asperities often remain on the hard disk surfaces after the burnishing operation is completed. Because these asperities may cause data errors or damage to the read/write head, detection of these asperities is necessary to ensure that the hard disks meet certain performance criteria.

Glide tests are performed to detect, either proximately or by contact, any remaining asperities which may come into contact with the read/write head during use. Glide tests utilize glide heads consisting of a slider that "flies" above the surface of the hard disk, and piezoelectric material coupled to the slider. In preferred embodiments of the present invention, the piezoelectric material may be lead zirconate titanate (PZT). Upon making contact with an asperity, the slider transmits a shock to the attached piezoelectric material. The shock disturbs the lattice of the piezoelectric material, causing it to vibrate and induce a voltage across its electrodes. The voltage of the piezoelectric material exhibits a frequency response with distinct vibrational modes dependent on the nature of the lattice disturbance, and a magnitude dependent on the size of the asperity and the location on the slider that makes contact with the asperity. In alternate embodiments of the present invention, other materials that develop a frequency-dependent voltage when disturbed may also be employed.

Present high storage-density hard disks require small read/write heads that hover at a low flying height over the surfaces of the hard disks. To avoid data errors and damage to the read/write heads, glide heads must therefore be able to detect small asperities which protrude above the hard disk surface greater than specified read/write head flying heights. Embodiments of the present invention are particularly adapted to accurately detect the presence and magnitude of these small asperities.

Figure 1:
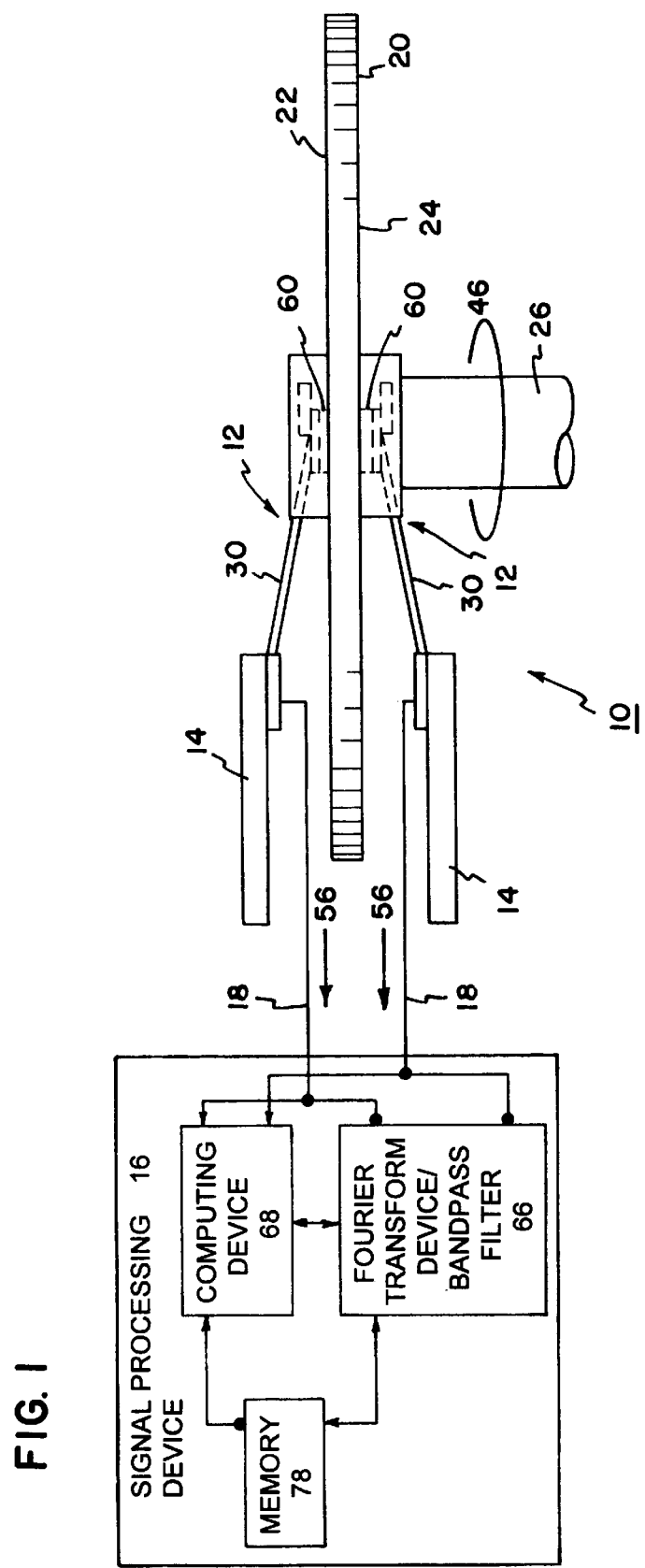
FIG. 1 is a diagram of a glide test system according to an embodiment of the invention.

FIG. 1 illustrates a glide test system 10 according to an embodiment of the present invention. Two glide head assemblies 12 are shown in use detecting the presence of asperities on opposite surfaces 22 and 24 of a hard disk 20 rotating about a spindle 26. While FIG. 1 only depicts a single hard disk 20, in alternative embodiments of the present invention a plurality of hard disks could be coupled to spindle 26, with each of these hard disks having an associated pair of glide head assemblies 12.

Each glide head assembly 12 is coupled to an associated support structure 14 adapted for testing one of the moving surfaces 22 or 24 of hard disk 20. The glide head assembly 12 communicates a voltage response 56 through electrical leads 18 to a signal processing device 16. Signal processing device 16 is responsive to the voltage response 56 and processes the voltage response 56 to determine the height of the asperity and, in alternate embodiments of the present invention, reach a pass/fail result.

A glide head assembly 12 according to an embodiment of the present invention is illustrated in FIG. 2. The glide head assembly 12 comprises a flexure arm 30 coupled at its distal end to a tongue 44, and coupled at its proximal end to a mounting bracket 34. Tongue 44 is additionally coupled to glide head 50, which is comprised of a slider 60 and a sensor 70. Mounting bracket 34 is provided with a pair of securement holes 36 for coupling the glide head assembly 12 to the support structure 14 (not shown in FIG. 2). Flexure arm 30 extends along a longitudinal axis 64 and includes a pair of spaced apart, upstanding sidewalls 40 which are symmetrical about longitudinal axis 64 and converge from the proximal end toward the distal end of flexure arm 30.

A pair of electrical leads 18 are coupled to the upper and lower surfaces 74 and 76 of sensor 70. A sleeve 28 is disposed longitudinally along an upper surface 32 of flexure arm 30 and operates to receive electrical leads 18. A pair of mounting U-brackets 38 are coupled to the proximal end of the flexure arm 30 for supporting electrical leads 18. In addition, a bracket 42 is coupled to the upper surface 32 of flexure arm 30 to help receivably retain sleeve 28.

Referring to FIG. 3, tongue 44 is coupled to flexure arm 30 by a tooling hole 52 and may thereafter be secured to flexure arm 30 by laser welding. Slider 60 includes a pair of spaced apart and longitudinally extending rails, inner rail 54 and outer rail 62, which project downwardly from slider 60 and contact asperities as they are encountered by glide head assembly 12.

Figure 4:
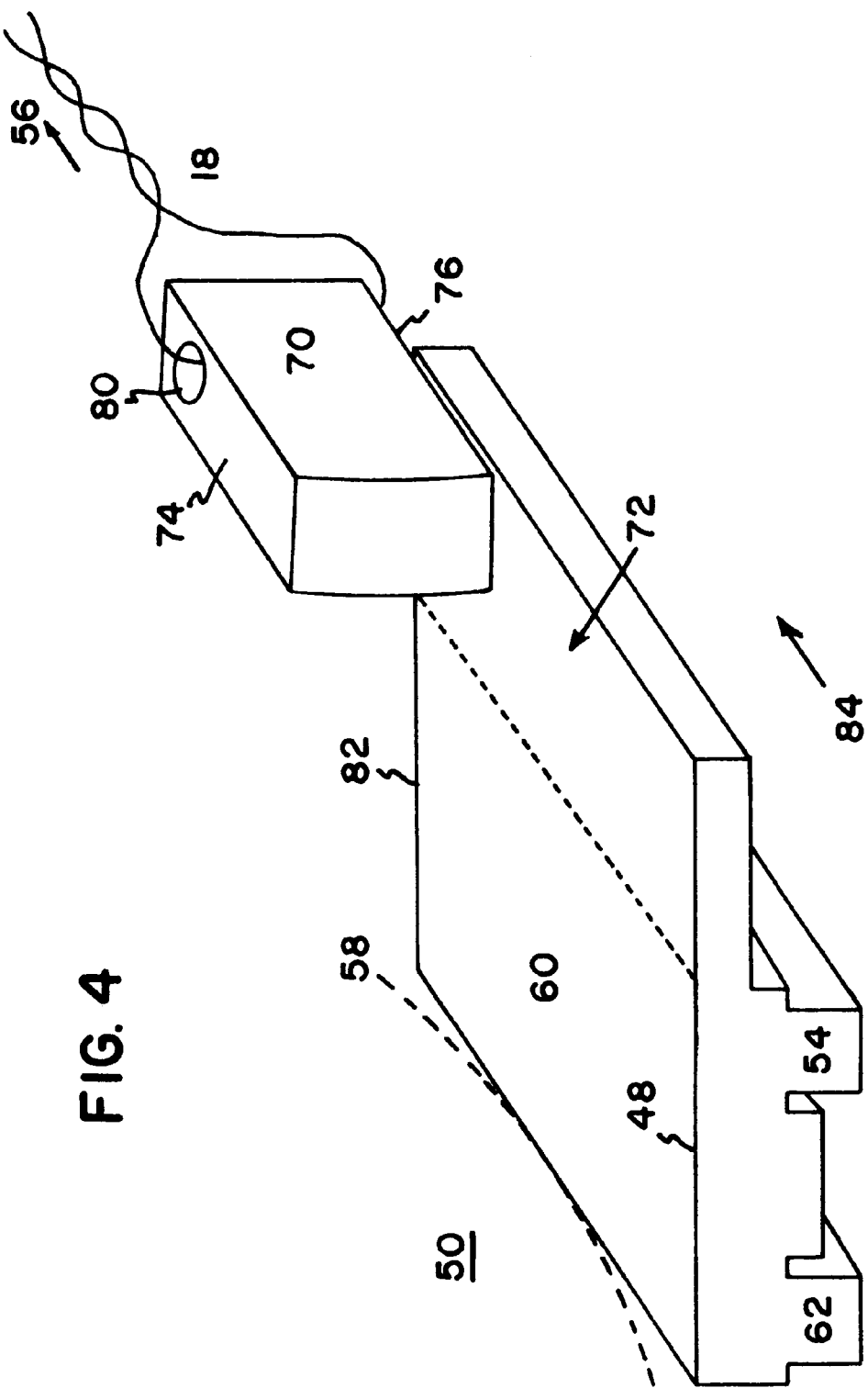
FIG. 4 is a perspective view showing a glide head according to an embodiment of the invention.

Referring to FIG. 4, glide head 50 is illustrated with wing 72 supporting sensor 70. Sensor 70 is mounted on wing 72 such that a portion of the sensor 70 is hanging off the trailing edge 82 of the slider 60, as determined by the direction of travel 84 of the hard disk 20 (not shown in FIG. 4) under the slider 60. In preferred embodiments of the present invention, 50% of the sensor 70 is mounted on the wing 72. Upper and lower surfaces 74 and 76, respectively, of sensor 70 contain electrodes 80 coupled to electrical leads 18. The cantilevering of the sensor 70 produces desired vibrational modes and allows attachment of an electrode 80 to lower surface 76.

Prior to performing the actual glide test, a number of pre-test computations are performed, and pass/fail criteria for the glide test may be established. First, the particular glide head configuration to be used in the glide test is computer-modeled. In embodiments of the invention according to FIG. 4, the modeling includes the slider 60, wing 72, and sensor 70. However, in alternate embodiments of the invention, other glide head configurations may be modeled. In preferred embodiments of the present invention, the glide head is modeled by a plurality of meshed brick elements, each with 8 nodes and 3 degrees of freedom (x, y, and z). The boundary conditions of the model are not constrained. In alternate embodiments of the present invention, other modeling approaches may be used.

Figure 5:
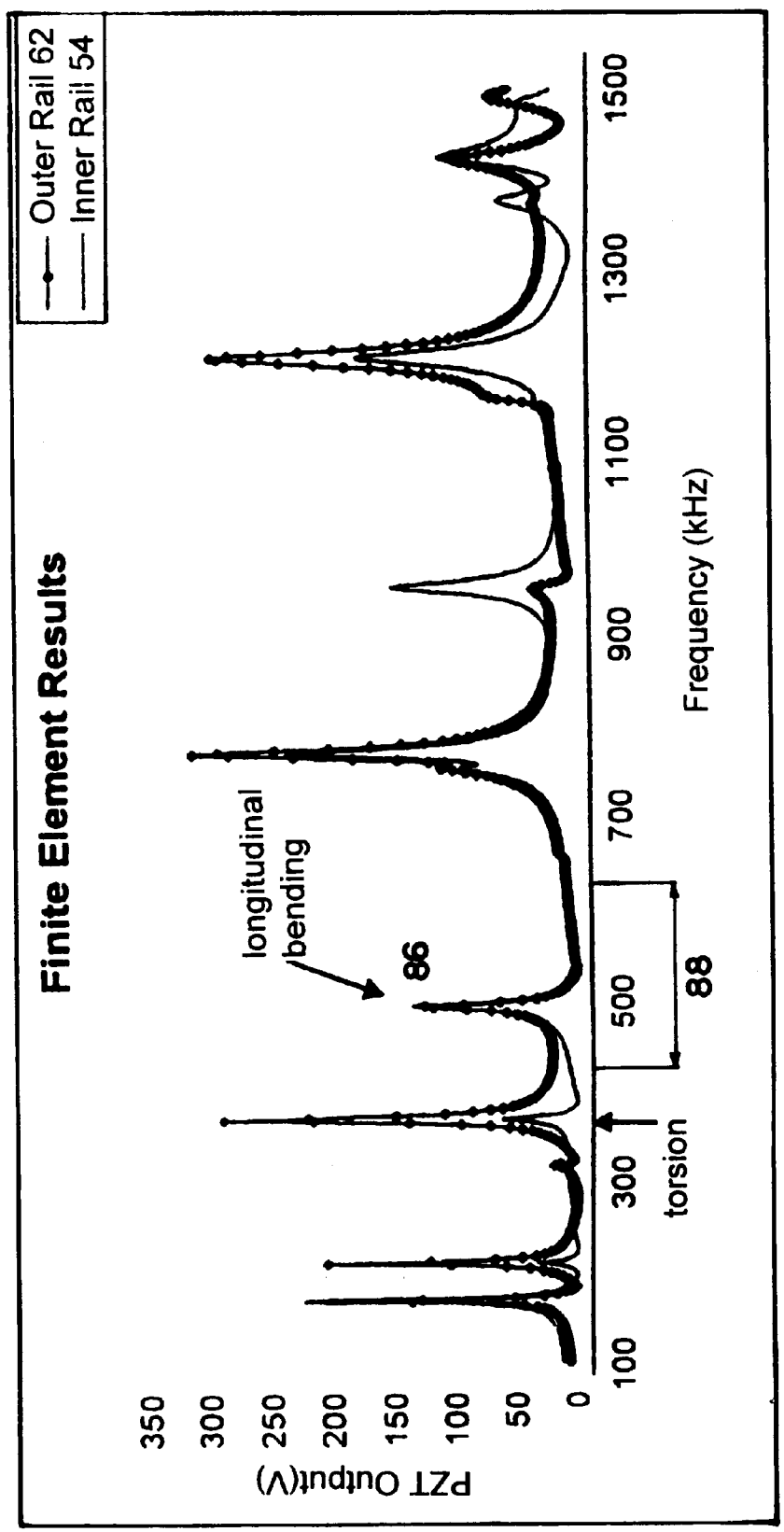
FIG. 5 is a graph of the voltage developed across a sensor as a function of the frequencies of various vibrational modes according to an embodiment of the invention.

Next, as shown in FIG. 5, a finite element analysis is performed on the computer model over a given frequency range and the magnitude of sensor resonance due to various impact locations on the slider 60 is identified. The voltage developed across the sensor 70 is computed as a function of frequency, resulting in frequency spikes at various vibrational modes, including, for example, torsion and longitudinal bending. In the glide head configuration of FIG. 4, vibrational modes may be chosen to correspond to impact locations at the trailing edges of the inner rail 54 and outer rail 62. However, in alternate embodiments of the present invention, other vibrational modes corresponding to different impact locations may be selected for analysis.

FIG. 5 displays finite element analysis results for two slider 60 contact points, the inner rail 54 and outer rail 62 of the slider 60 (not shown in FIG. 4). As FIG. 5 illustrates, the response varies depending on the location of the contact point. Because the decreased size of present day glide heads makes impact location increasingly difficult to determine, this impact location dependency can lead to imprecise measurement of asperities. A small asperity colliding with the inner rail may produce the same response as a large asperity colliding with the outer rail, and without knowing the contact point of the slider, the glide test may reject good disks or accept deficient disks.

However, as FIG. 5 illustrates, the frequency response of the glide head 50 for different slider contact points will match closely at a particular vibrational mode, designated herein as the impact-location-independent vibrational mode. The response of the glide head 50 will be relatively independent of its contact point at that frequency. By comparing the frequency response of the finite element analysis for a plurality of contact locations at various vibrational modes, the impact-location-independent vibrational mode can be identified. For example, the frequency response at each of the spikes shown in FIG. 5 can be examined, data point by data point, to find the vibrational mode at which the response of the glide head 50 is relatively independent of its contact point. For glide heads configured as in FIG. 4, the impact-location-independent vibrational mode was determined to be the longitudinal bending mode frequency 86 (the response due to the bending of the slider 60 from leading edge 48 to trailing edge 82, depicted by dashed lines 58 in FIG. 4) at approximately 500 kHz. However, for other glide head configurations according to embodiments of the present invention, the impact-location-independent vibrational mode may be different.

Next, a frequency window 88 may be established about the impact-location-independent vibrational mode, within which an RMS voltage will be measured. The frequency window 88 is necessary to fully encompass the impact-location-independent resonance and to account for analytical inaccuracies due to dimensional tolerances in the slider 60 and sensor 70 and variations in bonding location and materials when the sensor 70 is bonded to the slider 60. By utilizing linear regression techniques on data points about the impact-location-independent vibrational mode frequency spike, points on the curve where the slope falls below a set threshold may be used to determine a frequency window 88 large enough to fully encompass the frequency spike, with additional margin to account for the physical tolerances. For glide head configurations as in FIG. 4, the frequency window 88 is approximately 450–550 kHz. However, for other glide head configurations according to embodiments of the present invention, the frequency window 88 may be different.

The significance of analytically determining an impact-location-independent vibrational mode and a corresponding frequency window 88 is that within this frequency window 88, the frequency response of the glide head 50 to an asperity impact is substantially independent of the contact point on the glide head 50. Thus, by performing an RMS voltage computation about this impact-location-independent vibrational mode, an RMS voltage can be obtained substantially independent of the contact point of the glide head 50. Computing the RMS voltage about the impact-location-independent vibrational mode eliminates the contact point as a variable, resulting in a more accurate representation of the size of the asperity.

In preferred embodiments of the present invention, a pass/fail RMS voltage is then computed. To select the pass/fail RMS voltage, a finite element analysis is performed using an asperity modeled to be of maximum permissible size and impacting one of the previously analyzed glide head 50 contact points. An RMS voltage value is then computed within the frequency window 88 for the frequency response of the finite element analysis. This RMS voltage represents the maximum RMS voltage allowable. Actual RMS voltage values exceeding this maximum will therefore be an indication that the detected asperity is too large. In alternate embodiments of the present invention, this step of computing a pass/fail RMS voltage may be performed concurrently with the previously discussed step of performing a finite element analysis for two slider 60 contact points.

When the actual glide test is performed, a hard disk 20 under test is mounted to the spindle 26, which rotates in the direction indicated by the arrow 46 in FIG. 1. The sliders 60 utilize air currents generated by the rotation of the hard disk 20 to "fly" the sliders 60 above the surfaces 22 and 24 of the hard disk 20. Throughout the testing procedure, hard disk 20 rotates so that upper and lower surfaces 22 and 24 pass beneath or above sliders 60 with a constant linear velocity as opposed to a constant number of revolutions per minute. As hard disk 20 rotates, the glide head assemblies 12 are moved radially inward at a selected speed so that all surfaces of hard disk 20 eventually pass beneath the glide head assemblies 12. It should be noted that while FIG. 1 shows one particular orientation of glide head assemblies 12 relative to the hard disk 20, other orientations are contemplated as alternative embodiments of the present invention. For example, flexure arms 30 could be directed radially along hard disk 20 and the sliders 60 oriented perpendicular to the flexure arm 30 without jeopardizing response characteristics.

As illustrated in FIG. 4, when an asperity on the hard disk 20 makes contact with an outer rail 62 or inner rail 54 on the slider 60, the impact disturbs the lattice structure of the sensor 70 and a voltage response 56 appears on the electrodes 80. This voltage response 56 is communicated through the electrical leads 18 to the signal processing device 16 (not shown in FIG. 4).

In preferred embodiments of the invention, the signal processing device 16 comprises a Fourier transform device 66, a computing device 68, and memory 78 (see FIG. 1) employed to compute and store a frequency response similar to the response analytically obtained in FIG. 5. The Fourier transform device 66 performs a Fourier transform on the voltage response 56, and the resulting frequency spectrum is stored in memory 78. The computing device 68 then computes an RMS voltage within the frequency window 88 of the frequency spectrum stored in memory 78 as a representation of the height of the asperity encountered. This RMS voltage is designated herein as the actual RMS voltage.

In alternate embodiments of the present invention, the signal processing device 16 may comprise a bandpass filter (not shown in FIG. 1) designed to pass only frequencies within the frequency window 88, with the actual RMS voltage computation being derived from the output of the bandpass filter by the computing device 68.

In preferred embodiments of the invention, a pass/fail determination is then made by comparing the actual RMS voltage against the previously computed maximum RMS voltage allowable. If the actual RMS voltage exceeds the maximum RMS voltage allowable, the hard disk 20 under test is rejected.

Therefore, according to the foregoing description, preferred embodiments of the present invention provide a system and method for detecting and accurately measuring asperities on a hard disk independent of the point on the slider at which it contacts the asperity. In addition, preferred embodiments of the present invention provide a system and method for detecting and accurately measuring asperities on a hard disk independent of the point on the slider at which it contacts the asperity, and for rejecting those hard disks with asperities of a height greater than a predetermined level.

The foregoing description of preferred embodiments of the invention has been presented for the purposes of illustration and description. It is not intended to be exhaustive or to limit the invention to the precise form disclosed. It is intended that the scope of the invention be limited not by this detailed description, but rather by the claims appended hereto.

What is claimed is:

1. A system for detecting and measuring the height of asperities on a substantially flat solid surface, the system comprising:

a glide head assembly for contacting an asperity and producing a sensor voltage after contacting the asperity; and means for measuring the height of the encountered asperity by computing an RMS voltage from the sensor voltage.

2. A system for detecting and measuring the height of asperities on a substantially flat solid surface, the system comprising:

a glide head assembly for contacting asperities and producing a sensor voltage whose frequency response is a function of both the height of the asperities and the location on the glide head assembly at which the glide head assembly contacts the asperities; and a signal processing device responsive to the sensor voltage from the glide head assembly configured to define a frequency window within which the frequency response of the sensor voltage is substantially independent of the location on the glide head assembly at which the glide head assembly contacts the asperities, and to measure the height of an encountered asperity by computing an actual RMS voltage within the frequency window of the frequency response of the sensor voltage produced by the glide head assembly after contacting the asperity.

3. The system of claim 2, wherein the glide head assembly further comprises:

a glide head for producing the sensor voltage when the glide head contacts the asperities; and a flexure arm for positioning the glide head in close proximity to the substantially flat solid surface.

4. The system of claim 3, wherein the glide head further comprises:

a slider for flying the glide head over the substantially flat solid surface; and a sensor coupled to the slider for generating the sensor voltage when the glide head contacts the asperities.

5. The system of claim 4, wherein the sensor comprises:

a block of piezoelectric material that produces the sensor voltage when the block of piezoelectric material is disturbed.

6. The system of claim 5, wherein the slider includes a wing for attachment of the block of piezoelectric material, and wherein the block of piezoelectric material is mounted on a trailing edge of the wing such that the block of piezoelectric material is hanging partially off the trailing edge of the wing.

7. The system of claim 6, wherein the block of piezoelectric material is composed substantially of lead zirconate titanate (PZT).

8. The system of claim 2, wherein the signal processing device further comprises:

a Fourier transform device responsive to the sensor voltage for performing a Fourier transform on the sensor voltage and generating a frequency spectrum;

memory in communication with the Fourier transform device for storing the frequency spectrum; and a computing device in communication with the memory for computing the actual RMS voltage within the frequency window of the stored frequency spectrum.

9. The system of claim 8, wherein the signal processing device further comprises a bandpass filter corresponding to the frequency window for filtering the frequency response of the sensor voltage; and wherein the computing device computes an RMS voltage from the filtered frequency response of the sensor voltage as the actual RMS voltage representing the height of the asperity encountered.

10. The system of claim 2, wherein the signal processing device further comprises a computing device comprising:

a program to perform a plurality of finite element analyses on the glide head, each finite element analysis covering an identical set of vibrational modes but corresponding to a different location on the glide head at which the glide head contacts an asperity of maximum permissible size;

a program to compare frequency spikes produced by the vibrational modes in the plurality of finite element analyses to locate the frequency window where the frequency responses are similar and therefore relatively independent of the impact location of the glide head; and a program to compute the RMS voltage within the frequency window for any one of the plurality of finite element analyses as a maximum RMS voltage allowable.

11. The system of claim 2, in which the signal processing device further comprises:

a program to compare the actual RMS voltage to a maximum RMS voltage allowable; and a program to reject the substantially flat solid surface if the actual RMS voltage exceeds the maximum RMS voltage allowable.

12. The system of claim 2, wherein the signal processing device further comprises:

a bandpass filter corresponding to the frequency window for filtering the frequency response of the sensor voltage;

a computing device in communication with the bandpass filter for computing the actual RMS voltage from the filtered frequency response of the sensor voltage as the actual RMS voltage representing the height of the asperity encountered.

13. A method for measuring the height of asperities independent of the location on a glide head at which the glide head contacts the asperities, the method comprising the steps of:

performing a plurality of finite element analyses on the glide head, each finite element analysis covering an identical set of vibrational modes but corresponding to a different location on the glide head at which the glide head contacts an asperity of maximum permissible size;

comparing frequency spikes produced by the vibrational modes in the plurality of finite element analyses to locate a frequency window where the frequency responses are similar and therefore relatively independent of the impact location of the glide head;

passing a substantially flat surface beneath the glide head wherein a sensor voltage is generated when the glide head contacts the asperities on the substantially flat solid surface; and determining the height of the asperities from the frequency response of the sensor voltage within the frequency window.

14. The method of claim 13, wherein preceding the step of performing a plurality of finite element analyses on the glide head, each finite element analysis covering an identical set of vibrational modes but corresponding to a different location on the glide head at which the glide head contacts an asperity of maximum permissible size, the method further includes the step of:

creating a computer-model of the glide head.

15. The method of claim 13, wherein the step of comparing frequency spikes produced by the vibrational modes in the plurality of finite element analyses to locate a frequency window where the frequency responses are similar and therefore relatively independent of the impact location of the glide head further comprises the steps of:

comparing data points about the frequency spikes produced by the vibrational modes in each finite element analysis against the data points about the corresponding vibrational modes in the other finite element analyses and locating an impact-location-independent vibrational mode at which the data points show the least deviation; and selecting the frequency window about the impact-location-independent vibrational mode sufficient to encompass the impact-location-independent vibrational mode.

16. The method of claim 13, wherein the step of determining the height of the asperities from the frequency response of the sensor voltage within the frequency window further comprises the step of:

computing an RMS voltage within the frequency window for the frequency response of the sensor voltage as an actual RMS voltage representing the height of the asperity encountered.

17. The method of claim 16, further comprising the steps of:

computing the RMS voltage within the frequency window for any one of the plurality of finite element analyses as a maximum RMS voltage allowable;

comparing the actual RMS voltage to the maximum RMS voltage allowable; and rejecting the substantially flat solid surface if the actual RMS voltage exceeds the maximum RMS voltage allowable.

18. The method of claim 13, wherein the step of determining the height of the asperities from the frequency response of the sensor voltage within the frequency window further comprises the step of:

filtering the frequency response of the sensor voltage with a bandpass filter corresponding to the frequency window; and computing an RMS voltage from the filtered frequency response of the sensor voltage as an actual RMS voltage representing the height of the asperity encountered.

19. The method of claim 18, further comprising the steps of:

computing the RMS voltage within the frequency window for any one of the plurality of finite element analyses as a maximum RMS voltage allowable;

comparing the actual RMS voltage to the maximum RMS voltage allowable; and rejecting the substantially flat solid surface if the actual RMS voltage exceeds the maximum RMS voltage allowable.

20. A method for determining a frequency window in which the frequency response of a sensor for measuring the height of asperities is substantially independent of the location on a glide head assembly at which the glide head assembly contacts the asperities, comprising the steps of:

performing a plurality of finite element analyses on the glide head, each finite element analysis covering an identical set of vibrational modes but corresponding to a different location on the glide head at which the glide head contacts an asperity of maximum permissible size; and comparing frequency spikes produced by the vibrational modes in the plurality of finite element analyses to locate a frequency window in which the frequency responses are similar and therefore substantially independent of the impact location on the glide head.

21. A glide head for measuring the height of asperities, comprising:

a slider;

an inner and an outer rail extending downwardly from the slider to contact the asperities;

a wing with a leading and a trailing edge extending laterally from the slider; and a block of piezoelectric material mounted on the wing such that the block of piezoelectric material is hanging partially off the trailing edge of the wing.

* * * * *